Patented Jan. 7, 1947

2,413,695

UNITED STATES PATENT OFFICE 2,413,695

FLUORINATED COMPOUNDS AND PYROLYTIC METHODS FOR PREPARING THEM

Frederick B. Downing, Carneys Point, Anthony F. Benning, Woodstown, and Robert C. McHarness, Carneys Point, N. J., assignors to Kinetic Chemicals, Inc., Wilmington, Del., a corporation of Delaware No Drawing. Application June 19, 1943, Serial No. 491,562

3 Claims. (Cl. 260—653)

This case is a continuation-in-part of Serial No. 435,064.

A. This invention relates to the preparation of organic fluorine compounds by pyrolysis. By pyrolysis, we mean the transformation of a compound into another substance or other substances through the agency of heat alone. (Hurd, The Pyrolysis of Carbon Compounds, p. 9). The term "pyrolysis" used in this specification therefore will include not only the decomposition of compounds but also the making of more complex compounds. In the applications identified as Benning et al., Serial No. 344,666, filed July 10, 1940, and Benning Serial No. 379,473, filed February 18, 1941, are disclosed two processes involving a reaction between a fluoro-hydrocarbon and HCl in the presence of a catalyst. Those reactions may be described as additive, since their apparent course is the addition of HCl to the olefine in the place of double bonds. Those reactions were carried out at comparatively low temperatures, in most cases below 350° C., because those temperatures were satisfactory and because observations of a limited number of experiments at higher temperatures showed the existence of what were thought to be undesirable side reactions. We have now discovered that the side reactions are pyrolytic and of a fundamentally different nature than HCl addition, and that they and other reactions that occur at elevated temperatures can be put to valuable use.

B. It is an object of this invention to produce organic compounds by pyrolysis. Another object of the invention is to influence the result of the pyrolysis by the use of catalysts. Another object of the invention is to produce compounds which are useful, by methods which are economically and technically satisfactory. Another object of the invention is to produce new fluoro hydrocarbons. A particular object of the invention is to synthesize organic compounds having fluoralkyl chains by the pyrolysis of fluorohalogeno carbon compounds.

C. According to the preferred form of our invention $CF_3CH_2Cl$ is made into other compounds by pyrolysis. This reaction may be carried out in isolation, in the presence of a compound which affects the result produced and which we call a catalyst, or in the presence of inert gases such as nitrogen and helium.

E. Although for the production of particular compounds the reaction will be carried out under well-controlled conditions of time, temperature and pressure, complex mixtures of compounds of various molecular weights can be produced by subjecting the compounds to pyrolytic conditions for extended periods of time. Pressures may also be used to vary the results, although for the purposes of economy and safety each particular reaction should be carried out with the lowest pressure consistent with optimum results. For example, pressures of four atmospheres absolute have been found satisfactory in many cases. In general, operations may be carried out at pressures between .1 and 10 atmospheres absolute, but other pressures are useful and may be employed when an increase in efficiency will result.

F. This is a pyrolytic process. The disintegration and integration are produced essentially by heat. It is, therefore, important to select a temperature which will efficiently produce the reaction. The temperature should be selected to give optimum production of the desired product. We have found that excellent pyrolytic results have been produced at temperatures between 600° and 1000° C., but that particular substances have been pyrolyzed at temperatures as low as 400° C. and above 1000° C. under appropriate conditions of time and pressure. Electrical heating is efficient, but any method of heating may be applied. The temperatures which are used must also be chosen in view of the materials that compose the reaction apparatus.

G. The time of exposure of the reactants to the pyrolytic conditions is a matter of considerable importance where a particular product is desired. Extending the period of exposure frequently produces compounds of increased molecular weight.

H. In general, the pyrolysis proceeds to the integration of new fluoro hydrocarbons efficiently in the absence of catalysts. Catalysts are generally useful in altering the course of the pyrolysis, rather than in improving its efficiency. Heavy metal halides and halides of the alkaline earth metals, such as $BaCl_2$ and $CaCl_2$ have been used.

I. The process is preferably carried out continuously by passing the convertible material through a tube heated to a pyrolytically effective temperature. The tube should be composed of a material which is inert to the reaction and the reaction products. Carbon and the noble metals are sufficiently inert and have proved to be satisfactory materials for the construction of reaction chambers. The chamber need not be wholly composed of the inert material, but may be lined with it. Reaction chambers containing a platinum lining are particularly satisfactory. The process may be carried out in batches rather than continuously, but continuity is preferred.

J. The following example has been carried out and has been selected for inclusion in this specification, not as constituting any limitation of the work which has actually been done, but as sufficiently representative to enable persons skilled in the art to practice the invention. In this example the terms "conversion" and "amount converted" include the assumption that the disappearance of one mol of the primary organic material resulted in the liberation of one mol of halogen acid. This assumption is warranted by the close agreement between the figures for conversion obtained by acid analysis and the actual primary material which disappeared. The pyrolysis of this example was carried out at a pressure of about one atmosphere. The temperatures of the pyrolyses were measured with a thermocouple which was placed in contact with the outer surface of the reaction tube near the center of the heated zone, so that the true average temperatures of the gases in the tube may have been somewhat lower than the values given.

*Example XXIV*

$CF_3CH_2Cl$ was passed through a platinum-lined Inconel-jacketed nickel tube, 13.7 mm. i. d x 108 cm.; at a rate of about 110 g. per hour while the temperature in the tube was kept at about 615° C. over an estimated length of 200 mm. by electrical heating. The reaction products were washed with water, dried and condensed. Acid analysis showed a conversion of about 52%. The following compounds were isolated and identified in the product.

$CHF_3$ (B. P. —81° C.) with a vapor density of 2.217 g. per liter at 22° C. and 590 mm.

$C_3H_3F_5$ (B. P. —19.6°) with a vapor density of 5.06 g. per liter at 27° C. and 760 mm.

$C_4H_3ClF_6$ (B. P. 35–36°) with a vapor density of 5.272 g. per liter at 24° C. and 480 mm.

K. The reaction products may be washed with water or alkaline solution to remove acid constituents before condensation and analysis, although this is not necessary. In some cases, it is advantageous to separate certain desired components before acid removal.

M. The particular advantage of the invention is that a pyrolytic process has been discovered for the production of new compounds and for the more efficient production of old compounds, which is characterized by its simplicity and the ease with which it may be operated. The invention provides an efficient method of producing organic compounds containing fluorine. These compounds have uses in themselves, such as for refrigerants, anaesthetics, and solvents and are useful as intermediates for the production of alcohols, esters, halides, and alkyl derivatives. The invention is also useful for the synthesis of compounds having more carbon atoms than the compound pyrolyzed, and for the extension of carbon chains.

N. As many apparently widely different embodiments of this invention may be made without departing from the spirit and scope thereof, it is to be understood that we do not limit ourselves to the specific embodiments thereof except as defined in the appended claims.

We claim:

1. The composition represented by the formula $C_4H_3ClF_6$ having a boiling point of about 35–36° C. and a vapor density of about 5.272 g. per liter at 24° C. and 480 mm.

2. The process of producing fluoro organic compounds which comprises passing $CF_3CH_2Cl$ at a pressure of about one atmosphere through an elongated platinum lined tube heated at about 615° C.

3. The process of producing fluoro organic compounds which comprises heating $CF_3CH_2Cl$ alone at about 615° C. and isolating the fluoro organic compounds produced.

FREDERICK B. DOWNING.
ANTHONY F. BENNING.
ROBERT C. McHARNESS.